United States Patent
Gao et al.

(10) Patent No.: US 10,162,360 B2
(45) Date of Patent: Dec. 25, 2018

(54) VEHICLE ENVIRONMENT IMAGING SYSTEMS AND METHODS

(71) Applicant: GM GLOBAL TECHNOLOGY OPERATIONS LLC, Detroit, MI (US)

(72) Inventors: Xiujie Gao, Troy, MI (US); Jinsong Wang, Troy, MI (US); Wende Zhang, Troy, MI (US); Paul E. Krajewski, Troy, MI (US); Nancy L. Johnson, Northville, MI (US); Timothy J. Canner, Macomb, MI (US); Donald K. Grimm, Utica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 235 days.

(21) Appl. No.: 15/366,948

(22) Filed: Dec. 1, 2016

(65) Prior Publication Data

US 2018/0157267 A1 Jun. 7, 2018

(51) Int. Cl.
  *G06F 19/00* (2018.01)
  *G05D 1/02* (2006.01)
  *B60K 35/00* (2006.01)
  *B60R 1/00* (2006.01)

(52) U.S. Cl.
  CPC .......... *G05D 1/0246* (2013.01); *B60K 35/00* (2013.01); *B60R 1/00* (2013.01); *B60K 2350/1084* (2013.01); *B60R 2300/80* (2013.01); *B60R 2300/806* (2013.01)

(58) Field of Classification Search
  CPC ................. G05D 1/0246; B60K 35/00; B60K 2350/1084; B60R 1/00; B60R 2300/80; B60R 2300/806

USPC ......................................................... 701/28
See application file for complete search history.

(56) References Cited

U.S. PATENT DOCUMENTS

| | | |
|---|---|---|
| 8,098,174 B2 | 1/2012 | Moshchuk et al. |
| 2006/0271278 A1 | 11/2006 | Sakakibara et al. |
| 2008/0258934 A1 | 10/2008 | Chemali |
| 2013/0128044 A1 | 5/2013 | Zhang et al. |
| 2014/0111637 A1 | 4/2014 | Zhang et al. |
| 2015/0302735 A1 | 10/2015 | Geerlings et al. |
| 2016/0082839 A1* | 3/2016 | Ricci ....................... H04W 4/21 701/36 |
| 2016/0269456 A1* | 9/2016 | Ricci ................... H04L 65/4069 |

(Continued)

FOREIGN PATENT DOCUMENTS

KR     2007016612 A     2/2007

*Primary Examiner* — Ronnie M Mancho
(74) *Attorney, Agent, or Firm* — Quinn IP Law

(57) ABSTRACT

A vehicle includes at least one image capture device and a user display configured to display images receive from the at least one image capture device. The vehicle also includes a controller programmed to generate a user prompt to set a home vehicle position in response the vehicle entering a first parked state. The controller is also programmed to store at least one reference image indicative of an area in a vicinity of the vehicle corresponding to the home vehicle position. The controller is further programmed to collect a current image corresponding to a current vehicle position in response to a subsequent approach toward the vicinity, and compare the current image to the reference image. The controller is further programmed to generate a user display depicting the vicinity, the current vehicle position, and the home vehicle position.

24 Claims, 10 Drawing Sheets

(56) References Cited

U.S. PATENT DOCUMENTS

2016/0306615 A1* 10/2016 Ricci ................... H04W 4/90
2017/0008562 A1* 1/2017 Shashua ............... G01C 21/32

* cited by examiner

VEHICLE ENVIRONMENT IMAGING SYSTEMS AND METHODS

TECHNICAL FIELD

The present disclosure relates to vehicle imaging systems and methods for providing driver positioning assistance.

INTRODUCTION

In order to maneuver a vehicle within a space-limited area, such as a garage, a driver must simultaneously be aware of the dynamic distances between the driver's vehicle and other vehicles, walls, and/or objects. If a vehicle is parked too close to a particular external item, damage may be incurred by the vehicle and/or the wall when the driver subsequently exits the vehicle. Similarly, if a vehicle is parked too close to the back wall (i.e., the wall opposite the garage door) of a garage, damage may be incurred by the vehicle and/or the garage door if the vehicle protrudes from the opening of the garage when the garage door is closed.

SUMMARY

A vehicle includes at least one image capture device and a user display configured to display images receive from the at least one image capture device. The vehicle also includes a controller programmed to generate a user prompt to set a home vehicle position in response the vehicle entering a first parked state. The controller is also programmed to store in a non-transient data memory at least one reference image indicative of a vicinity of the vehicle corresponding to the home vehicle position. The controller is further programmed to capture a current image corresponding to a current vehicle position in response to a subsequent approach toward the vicinity, and compare the current image to the reference image. The controller is further programmed to generate a graphic at the user display based on the comparison depicting the vicinity, the current vehicle position, and the home vehicle position.

A method of providing vehicle parking assistance includes storing a reference vehicle position based on at least one location signal received at a vehicle controller. The method also includes capturing at least one reference image indicative of a vicinity of the vehicle while located at the reference vehicle position. The method further includes capturing at least one current image indicative of a current vehicle position relative to the reference vehicle position in response to a subsequent approach toward the vicinity. The method further includes generating a display image including a first graphic indicative of the current vehicle position and a second graphic indicative of the reference vehicle position.

A vehicle includes at least one image capturing device, and a user display configured to display images receive from the at least one image capture device. The vehicle also includes a controller programmed to store a plurality of data sets indicative of a reference vehicle position of the vehicle. The data sets include at least one reference image pattern indicative of a vicinity of the vehicle. The controller is also programmed to display a target graphic at the user display indicative of the reference vehicle position in response to a subsequent approach toward the vicinity. The controller is further programmed to overlay a current vehicle position graphic with the target graphic to inform a driver of a current vehicle position relative to the reference vehicle position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
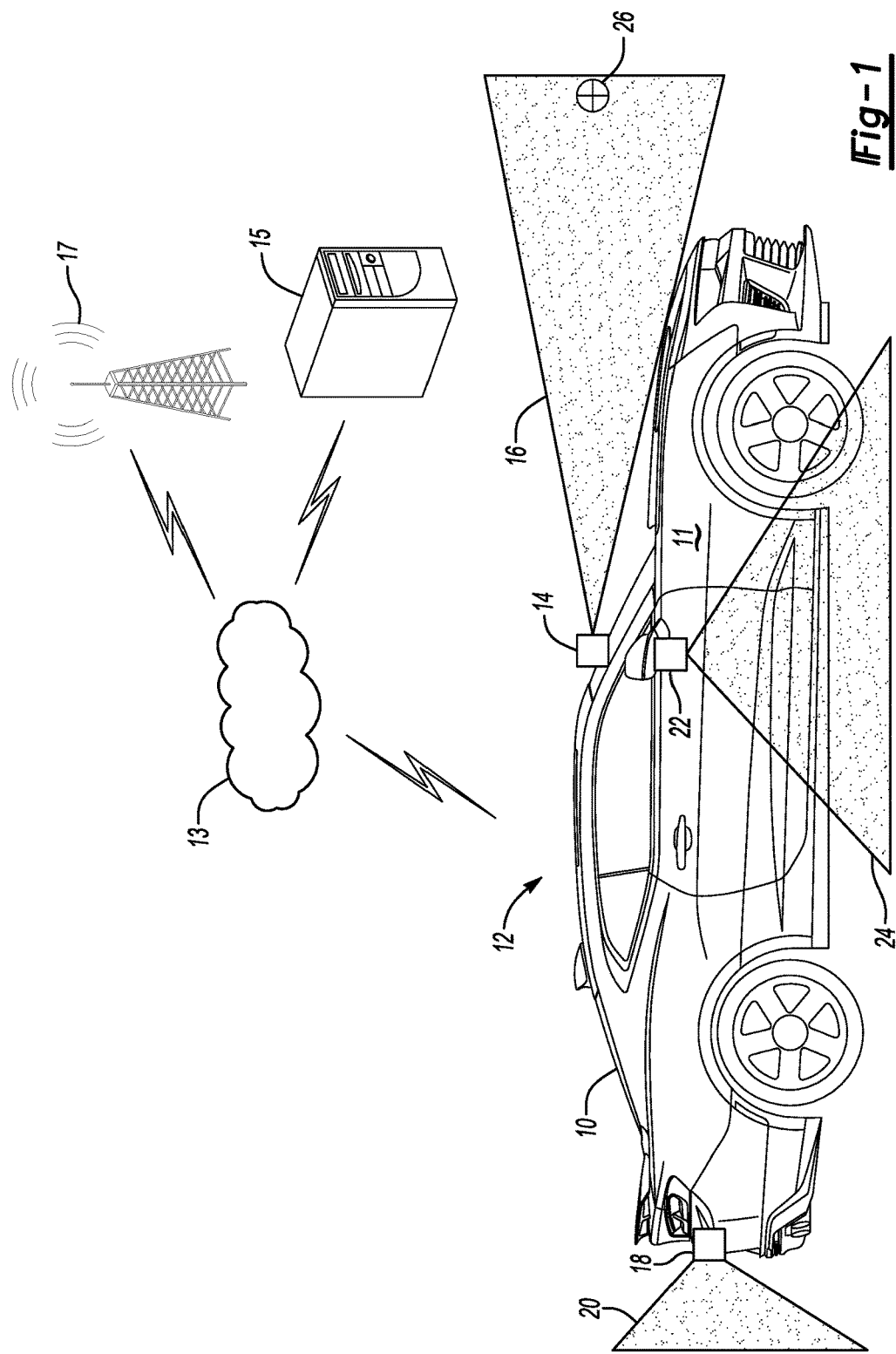
FIG. 1 is a side view of a vehicle having a vision system.
Figure 2:
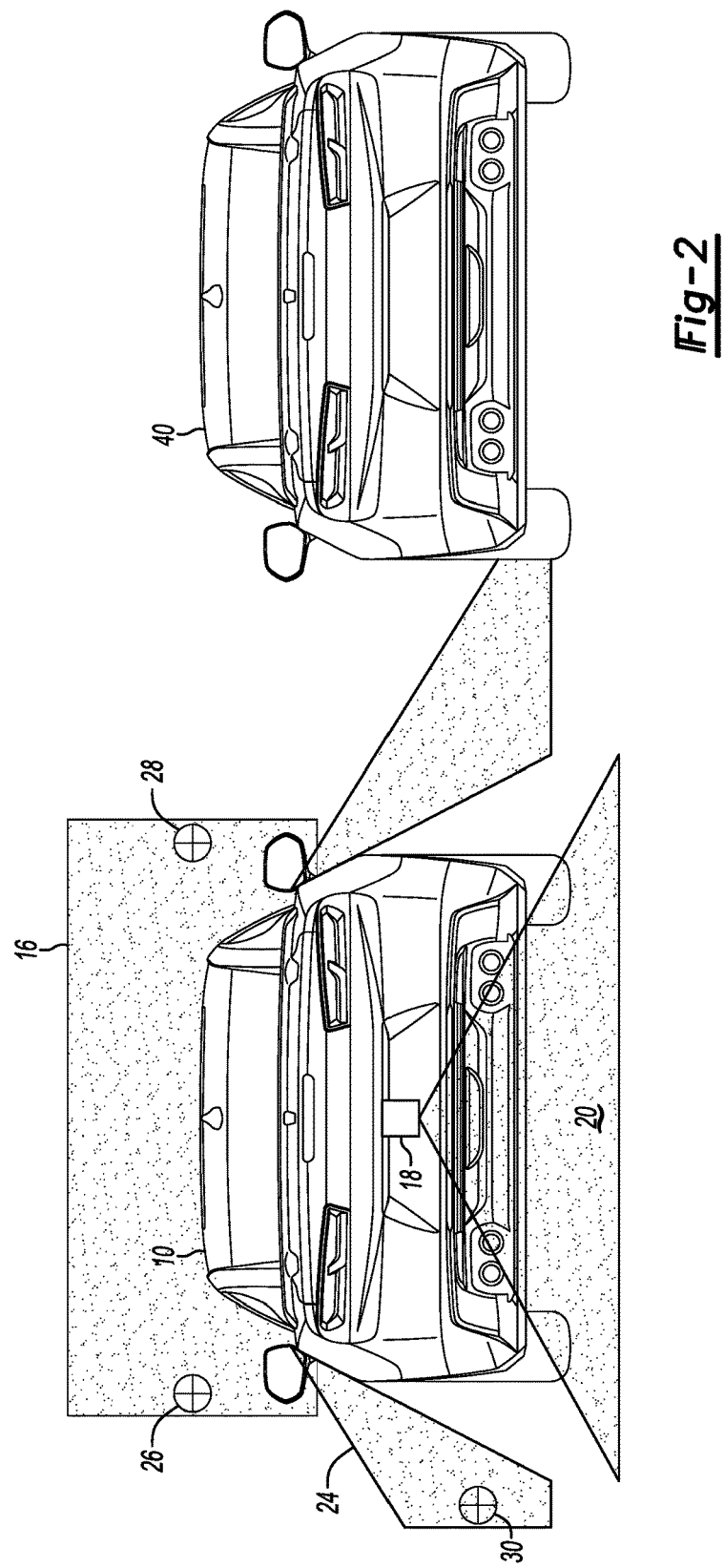
FIG. 2 is a rear view of the vehicle of FIG. 1.
Figure 3:
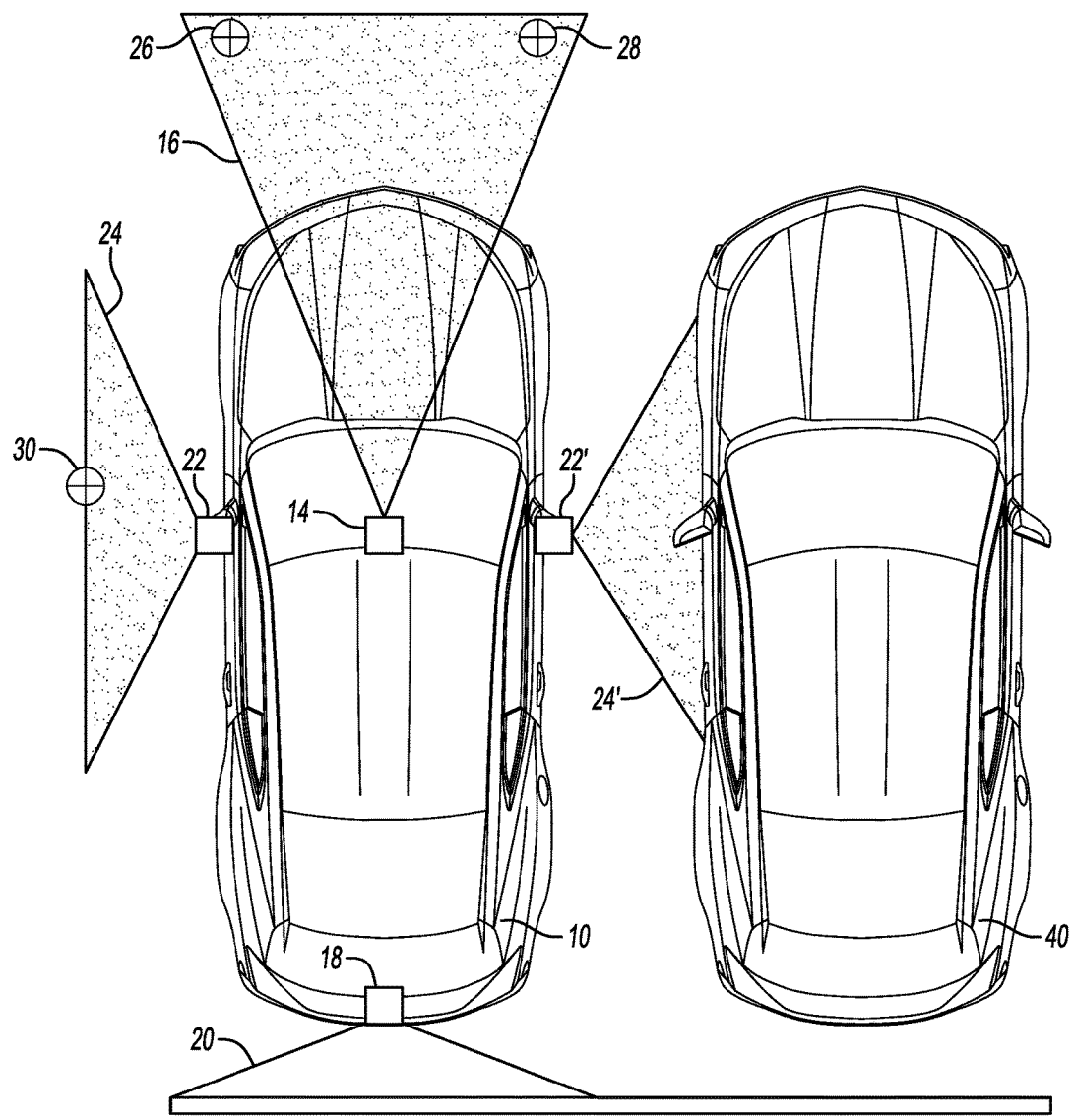
FIG. 3 is a top view of the vehicle of FIG. 1.

Referring collectively to FIG. 1 through FIG. 3, a vehicle 10 includes a vision system 12 configured to capture images in a plurality of regions surrounding the vehicle, including, but not limited to, images in a forward-facing direction, a rearward-facing direction, and/or or images in lateral-facing directions. The vision system 12 includes at least one vision-based imaging device to captures images corresponding to the exterior of the vehicle 10 for detecting the vehicle surroundings. Each of the vision-based imaging devices is mounted on the vehicle so that images in the desired region of the vehicle vicinity is captured.

A first vision-based imaging device 14 is mounted behind the front windshield for capturing images representing the vehicle's vicinity in an exterior forward direction. In the example of FIG. 1 through FIG. 3, the first vision-based imaging device 14 is a front-view camera for capturing a forward field-of-view (FOV) 16 of the vehicle 10. In additional examples, an imaging device may be disposed near a vehicle grill, a front fascia, or other location closer to the forward edged of the vehicle. A second vision-based imaging device 18 is mounted at a rear portion of the vehicle to capture images representing the vehicle's vicinity in an exterior rearward direction. According to an example, the second vision-based imaging device 18 is a rear-view camera for capturing a rearward FOV 20 of the vehicle. A third vision-based imaging device 22 is mounted at a side portion of the vehicle to capture images representing the vehicle's vicinity in an exterior lateral direction. According to an example, the third vision-based imaging device 22 is a side-view camera for capturing a lateral FOV 24 of the vehicle. In a more specific example, a side-view camera is mounted on each of opposing sides of the vehicle 10 (e.g. a left side-view camera and a right side-view camera). It should be appreciated that while various FOV's are depicted in the Figures as having certain geometric patterns, actual FOV's may have any number of different geometries according to the type of imaging device which is employed in practice. Additionally, while each of the cameras is depicted as being mounted on the vehicle, alternate examples include external cameras having FOV's which capture the surrounding environment of the vehicle.

The cameras 14, 18, and 22 can be any type of imaging device suitable for the purposes described herein, that are capable of receiving light, or other radiation, and converting the light energy to electrical signals in a pixel format using, for example, charged coupled devices (CCD). Each of the cameras may also be operable to capture images in various regions of the electromagnetic spectrum, including infrared, ultraviolet, or within visible light. The cameras may also be operable to capture digital images and/or video data in any suitable resolution including high-definition. As used in the present disclosure, image data includes either individual images or a stream of video images. The cameras may be any digital video recording device in connection with a processing unit of the vehicle. Image data acquired by the cameras is passed to the vehicle processor for subsequent actions. For example, image data from the cameras 14, 18, and 22 is sent to a processor, or vehicle controller 11, which processes the image data. In the case of external cameras, image data may be wirelessly transmitted to the vehicle controller 11 for use as described in any of the various examples of the present disclosure. As discussed in more detail below, the vehicle processor 11 may be programmed to generate images and other graphics at a user display such as, for example, a console screen or at a review mirror display device.

The various vision system components discussed herein may have one or more associated controllers to control and monitor operation. The vehicle controller 11, although schematically depicted as a single controller, may be implemented as one controller, or as system of controllers in cooperation to collectively manage the vision system and other vehicle subsystems. Communication between multiple controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. In a specific example, multiple controllers communicate with one another via a serial bus (e.g., Controller Area Network (CAN)) or via discrete conductors. The controller 11 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 11 may also store a number of algorithms or computer executable instructions in non-transient memory that are needed to issue commands to perform actions according to the present disclosure.

The controller 11 is programmed to monitor and coordinate operation of the various vision system components. The controller 11 is in communication with each of the image capturing devices to receive images representing the vicinity and may store the images as necessary to execute parking assist algorithms described in more detail below. The controller 146 is also in communication with a user display in an interior portion of the vehicle 10. The controller is programmed to selectively provide pertinent images to the display to inform passengers about conditions in the vicinity of the vehicle 10.

The controller 11 may also be capable of wireless communication using an internal transceiver. The transceiver may be configured to exchange signals with a number of off-board components or systems. The controller 11 is programmed to exchange information using a wireless communications network 13. Data may be exchanged with a remote server 15 which may be used to reduce on-board data processing and data storage requirements. In at least one example, the server 15 performs processing related to image processing and analysis. The server may store one or more model-based computation algorithms to perform parking assist functions. The controller 11 may further be in communication with a cellular network 17 or satellite to obtain a global positioning system (GPS) location. The controller 11 may also be in direct wireless communication with objects in a vicinity of the vehicle 10. For example, the controller may exchange signals with a garage door opener to influence when the garage door is actuated to an opened or closed position based on data acquired from the vision system 12.

The vision system 12 may be used for recognition of road markings, lane markings, road signs, or other roadway objects for inputs to lane departure warning systems and/or clear path detection systems. Identification of road conditions and nearby objects may be provided to the vehicle processor to guide autonomous vehicle guidance. Images captured by the vision system 12 may also be used to distinguish between a daytime lighting condition and a nighttime lighting condition. Identification of the daylight condition may be used in vehicle applications which actuate or switch operating modes based on the sensed lighting condition. As a result, the determination of the lighting condition eliminates the requirement of a dedicated light sensing device while utilizing existing vehicle equipment. In one example, the vehicle processor utilizes at least one captured scene from the vision system 12 for detecting lighting conditions of the captured scene, which is then used to adjust a dimming function of one or more image displays such as at a rearview mirror or other external view displays. In addition to the above-describe functions of the vision system, aspects of the present disclosure include parking enhancement to improve accuracy of vehicle positioning within a known parking location.

According to aspects of the present disclosure, images captured by the vision system 12 are used to enhance vehicle parking at a predetermined location. More specifically, the vision system 12 may be use to prevent vehicle damage due to contact with objects in a parking location by providing an indication that the vehicle is improperly positioned in a parking space, or indication that one or more of the vehicle closures is not be fully closed when approaching or departing from a parking space. In one example, portions of a parking assistance algorithm conditionally render one or more external camera views to the driver. In a more specific example, the parking assistance algorithm may be used in combination with camera image pattern storing and comparison to provide advanced warnings and other actions for garage entry and exit enhancement.

Figure 4:
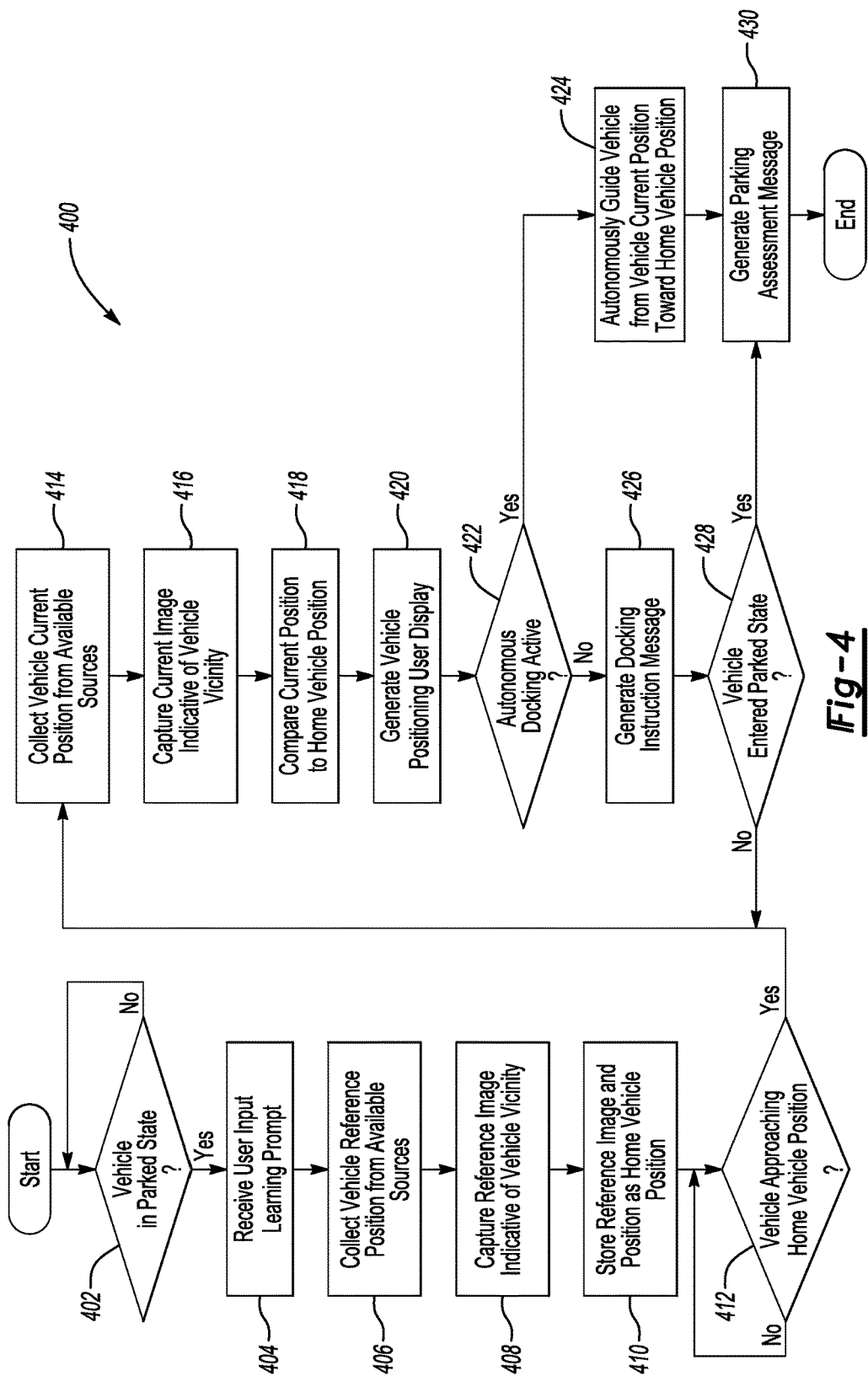
FIG. 4 is a flowchart of a parking assistance algorithm.

Referring to FIG. 4, a method 400 represents an example parking assistance algorithm. An initial portion may include the vehicle learning a desired home parking location to be used in future parking maneuvers. At step 402 the algorithm includes determining whether the vehicle is in a parked state. The parked state allows a user to engage the self-learning portion of the algorithm such that the vehicle stores information pertaining to a frequent parking location, such as a garage for example. At step 404 a user may prompt the learning portion by providing input at user interface, such as a touch screen user display. In alternate examples, a user may prompt the self-learning algorithm by providing input at a mobile device which may be in communication with the vehicle either directly or through an external server.

In response to the user input prompting self-learning, the algorithm includes determining a present location signature of the vehicle and storing it for later reference as a vehicle "home" position. While the term home position is used in the present disclosure, it should be appreciated that a driver may set a "home" vehicle position as a reference vehicle position for any location to which the driver would like to return at a later time. Furthermore, the vehicle may be configured to store and manage any number of multiple "home" positions such that there is a plurality of known parking locations having associated vision data to rely on during future approaches to any of the stored parking locations. In further alternative examples, the vehicle controller may be programmed to automatically store at least one data set indicative of a reference vehicle position when there is a high likelihood that the vehicle may return to a parked state at the same location (e.g., repeat parking maneuvers detected).

The present location of the vehicle may be determined from a number of available sources. The algorithm may include compiling multiple location indicators from different sources. In an example, a vehicle controller stores location information from at least one of a GPS location, a vehicle telecommunications module, a user mobile device, a local Wi-Fi network (e.g., an SSID of a WLAN transmission), as well as other connected vehicle data sources. Compilation of the multiple sources of location data may operate to provide a specific combination of location data which serves as a home location signature.

At step 408 the algorithm includes performing camera scene detection to identify visual characteristics of the current location. Discussed in more detail below, such visual characteristics may include the presence of predetermined markers or targets within a FOV, quick read (QR) tags containing information in a 2D bar code, or recognition of native environment landmark objects in the vicinity of the vehicle. The use of particular visual characteristics of the landscape around the vehicle which acquired by the vision system helps to increase positioning accuracy for subsequent parking maneuvers at a previously-learned location. At step 408 the algorithm includes capturing a reference image from one or more image capture devices which are positioned to generate images indicative of the vicinity of the vehicle. The one or more images is captured and used by the vehicle processor to associate the images with the vehicle home position. Each of the images are captured as a set of reference images. In some examples, distance information is also gathered with respect to the proximity of nearby objects or markers placed by a user.

At step 410, both of the set of reference images and the home position may be stored in a memory of the vehicle processor. The reference data set is collectively associated with a home vehicle position, and available to be recalled for subsequent use. In some examples, image patterns and locations may be updated over time for example based on differences between seasons (e.g., winter/summer) and other minor changed in the parking location vicinity. Such changes can be stored in memory to update the stored vehicle home position and represent the most recent visual conditions at the predetermined parking location.

At a subsequent time, the algorithm includes recognizing when the vehicle returns and approaches the home vehicle position. At step 412 the vehicle may enter a parking assist portion of the algorithm to enable precise vehicle positioning for parking at the predetermined location, or home vehicle position. According to an example, the vehicle may generate a user display inquiring whether parking guidance is desired by the customer to dock the vehicle at an identified nearby parking space. At step 412 if no approaching condition is detected, the algorithm may include continuing to poll and monitor for an approach towards a known parking location.

If at step 412 the controller detects an approach towards a predetermined parking location, the algorithm includes calculating a vehicle approach direction, capturing real-time patterns of markers and/or landmark objects, and comparing the real-time patterns to previously-stored patterns. More specifically, at step 414 the algorithm includes collecting a current vehicle position based on a collection of all of the available location data. As discussed above, each of multiple sources of location data is compiled to generate a current vehicle location signature.

At step 416 the algorithm includes capturing one or more real-time images indicative of the current vicinity near the vehicle. Such real-time vicinity information may be useful for guiding the vehicle towards the predetermined parking location. At step 418, the current vehicle position is compared against the home vehicle position to determine a required movement to converge the current vehicle position with the home vehicle position. Such a comparison may include comparing the location data to acquire rough positioning guidance based on the macro level location information. The comparison also includes comparing the image data representing the vicinity of the vehicle for more granular positioning guidance to enable a precise return to a previously-learned vehicle position.

The algorithm of method 400 also includes informing a driver about the current vehicle position status relative to the target home vehicle position. At step 420 the algorithm includes generating a graphical user display to provide visual information to a driver. This real-time information may be helpful to provide the driver with information regarding the progress of the vehicle towards docking in the home vehicle position. As discussed in more detail below, the user display may include at least an environmental frame of reference and a current vehicle position relative to the environment. In one example a top view perspective, such as the perspective of FIG. 3, is provided such that a driver may see the full perimeter of the vehicle relative to the environment. In some alternate examples, the visual display of the frame of reference may be generated using additional image data from each of a plurality of external cameras.

At step 422, the algorithm includes an allowance for either an autonomous vehicle self-docking mode or a manual docking mode where the driver steers the vehicle toward the stored vehicle home position. If at step 422 the autonomous docking is activated, one or more controllers associated with vehicle guidance is programmed to autonomously steer the vehicle at step 424 from vehicle current position toward the home vehicle position. In some examples, autonomous docking is part of a comprehensive autonomous driving protocol. In other examples, the autonomous docking is employed for a partially autonomous vehicle as a special parking feature where substantially all of the remainder of vehicle driving is conducted through manual steering by a driver.

If at step 422 autonomous docking is not enabled, the algorithm includes generating at least one docking instruction message at step 426 to provide instructions to the driver on how to maneuver the vehicle to converge the current vehicle position with the home vehicle position. Docking instruction messages may include any number instructions to help the driver correct the vehicle trajectory and/or instant position. For example, in the case where the vehicle is pulled into the parking space in a forward-facing direction, a rear camera view may be provided at the display interface and a message may be provided to the driver such as "SHOWING REAR VIEW. PLEASE CHECK FRONT!" The message may be a textual display message, an audio message, and may be accompanied by other audio chimes, voice instructions, haptic warnings, or other indicators. In other examples a degree of trajectory correction may be provided to the driver, such as "TURN WHEEL SLIGHTLY LEFT," or "STEER HARD LEFT." In further examples, a real-time numerical steering indicator may be provided to instruct a driver to rotate the steering wheel to converge to an optimal steering angle. While messages pertaining to arrival at a predetermined parking location are provided by way of example, messages corresponding to departure of the space are provided in in alternate examples such as those discussed below. In this way, the vehicle may safely exit a confined space using the visual imaging data and location data to instruct a driver to steer the vehicle without contacting objects in the vehicle vicinity.

At step 428 if the vehicle is transferred into a parked state, the algorithm determines that the driver has completed a docking maneuver. If the vehicle is not in a parked state at step 428, the algorithm may return to step 414 and continue to poll and monitor the current vehicle position against the reference home vehicle position as well as the vehicle environment.

Once the vehicle has entered a parked state at step 428, the algorithm includes generating a parking assessment message at step 430. The parking assessment message may include a subjective indication of vehicle position such as "SAFE," "NOT SAFE," "PLEASE PULL FARTHER INTO THE GARAGE," or "BACK UP SLIGHTLY" for example. In other examples, the parking assessment message includes further instructions for the driver to continue to move the vehicle from the current vehicle position to a more preferred final position. In some examples, a vehicle may not be pulled into (or backed into) a garage far enough to be able to close a garage door. In such a case, a message instructing the user about infrastructure devices may be provided such as "DO NOT CLOSE GARAGE DOOR." In further alternative examples, a user is allowed to calibrate an updated final position relative to a previously-stored reference vehicle position. That is, the user may input preferences at the user interface to cause the vehicle to target a new reference position which is a desired distance away from a previously-stored reference vehicle position.

The algorithm may include conditionally rendering a camera view corresponding to a back portion of a parking area in response to the driver putting the vehicle into park at step 428. It should be appreciated that the back portion of a parking space may be viewed by either a front-facing camera or a rear-facing camera depending on the parking orientation of the vehicle (i.e., whether the vehicle is driven forward into the parking space or backed in). In one example, a rear portion of a garage is displayed. The algorithm may further use one or more garage landmarks (e.g., posts or other fixed features) to determine a proper parking offset. Comparison may be then be performed between the currently sensed pattern and the stored pattern to allow an assessment of whether the vehicle is properly positioned.

In further examples the algorithm may include the vehicle providing instruction to disable certain infrastructure devices to prevent contact with the vehicle. In one example a message may be transmitted from the vehicle preventing a garage door from closing if a portion of the vehicle is within a closing path of the garage door. This may be caused by an improper parking position, or an open vehicle closure, for example. In the case of fully or partially autonomous vehicles, the algorithm may further include autonomously driving the vehicle further into the parking location such that so that the area near a closing door is clear.

Referring back to FIG. 1 through FIG. 3, collectively, pre-defined symbols or markers may be used for pattern recognition during image system parking assist. Any number of markers may be mounted to walls, ceilings, and floors of a garage within a FOV of any of the plurality of imaging devices. A user may place predefined symbols in two or three locations in the vicinity of the parking location that are in one or more FOV's of the vision system 12. Considering the specific examples depicted in the figures, a first marker 26 and a second marker 28 may be affixed to a back portion of a desired parking location, and a third marker 30 may be affixed to a side portion of the desired parking location. The first marker 26 and a second marker 28 are positioned to be within the forward FOV 16. Similarly, the third marker 30 is position to be within the lateral FOV 24. Much like previously-discussed examples, a driver may park the vehicle in a desired parking location then activate the self-learning process during which the vehicle processor calculates the vehicle location and orientation based on the location and size of the markers within its view. The processor may store the combination of the previously-located markers as a visual pattern denoting the home vehicle position. The location of the plurality of markers may also be displayed as part of the user display to enhance the driver's frame of reference.

Specific marker types may be used to provide information or transmit data to the vehicle. In alternate examples, a customer may position one or more predefined quick response (QR) codes in locations in a parking area that are within a FOV of the vision system 12. QR codes are generally a type of machine-readable optical label that commonly contains information about an item to which they are attached. QR codes may include any of a number of standard encoding types, and consist of black squares arranged in a square grid on a white background, which can be read by an imaging device such as a camera. The image of the QR code can be processed to extract data from patterns that are present in both horizontal and vertical components of the image.

QR codes included as part of one or more markers can be used as a marketing tool providing links to one or more relevant corporate websites. In one example, branded information targeted to drivers of the particular host vehicle is provided at the user interface during a vehicle self-parking procedure in response to detection of the QR code. In other examples, information contained in the QR codes may be used to determine whether or not to engage the self-parking mode. More specifically, the vision system may detect the QR codes while pulling into the parking location and reference the data contained in the 2D code, such as vehicle identification information. If QR code information does not match that of the currently-parking vehicle, the QR code may be ignored for the purposes of parking. If the code does match, the vehicle controller may use the QR code locations as location reference markers as discussed above.

Figure 5:
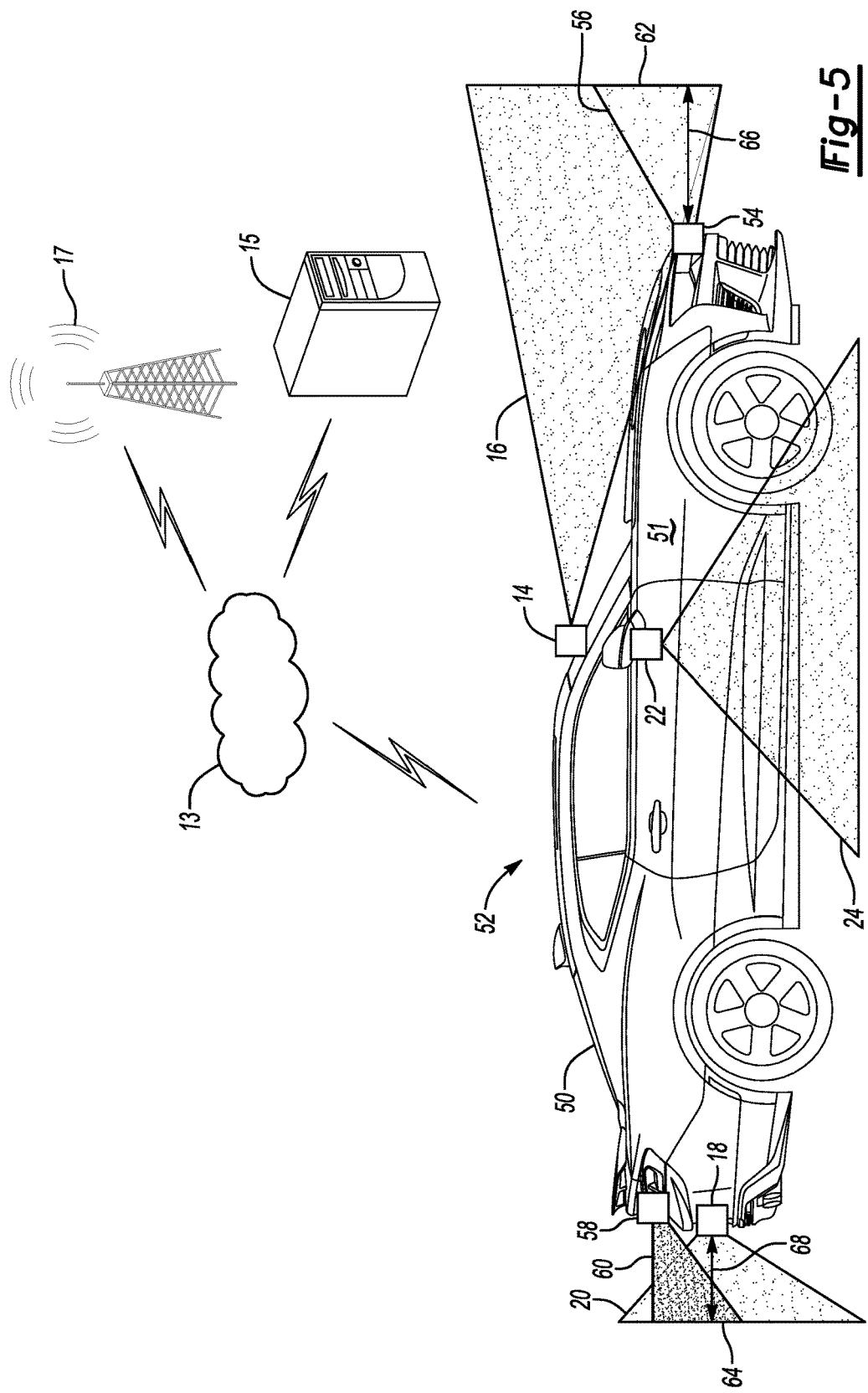
FIG. 5 is a side view of a vehicle having a vision system according to a second example.
Figure 6:
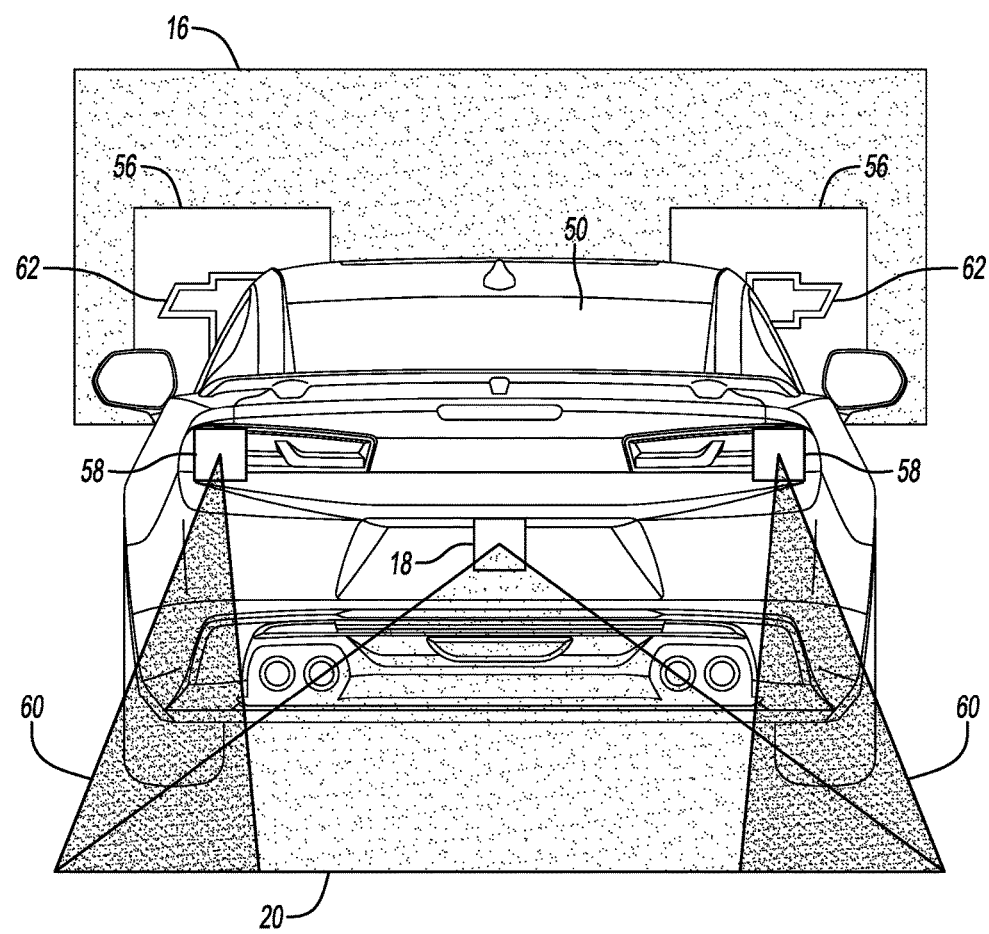
FIG. 6 is a rear view of the vehicle of FIG. 5.
Figure 7:
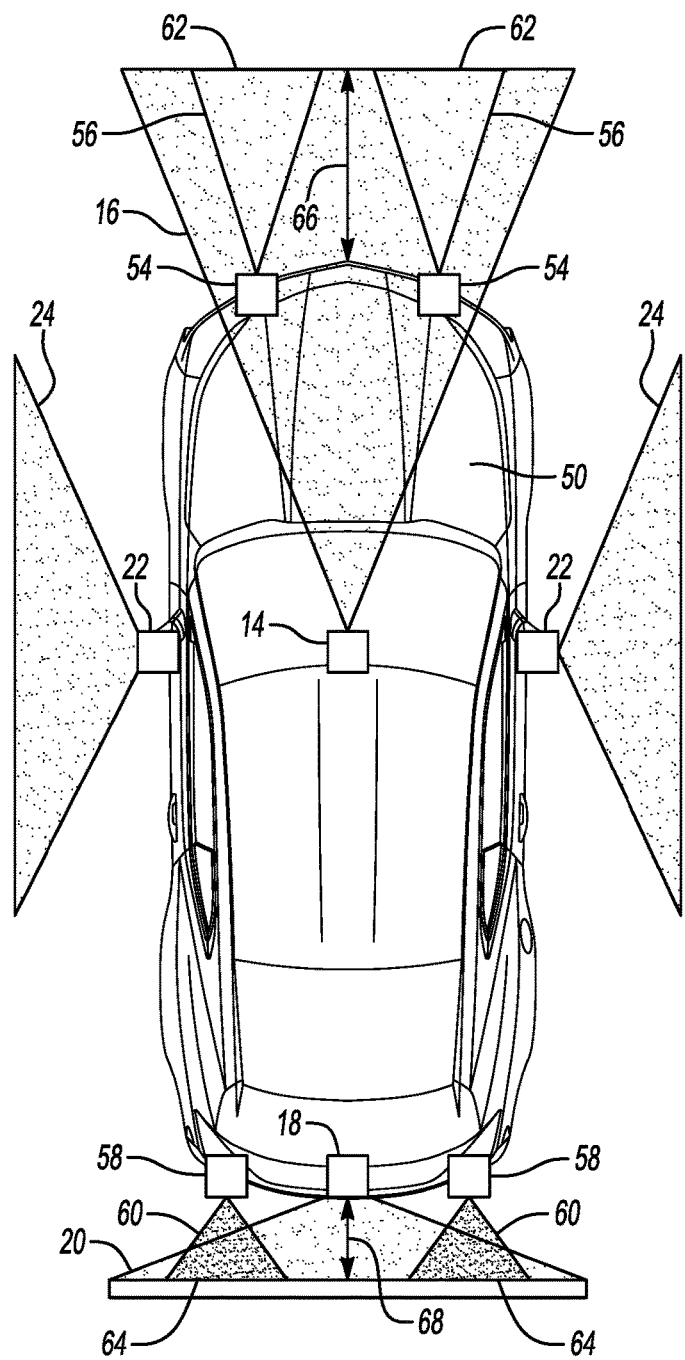
FIG. 7 is a top view of the vehicle of FIG. 5.

Referring to FIG. 5 through FIG. 7, optically projected patterns may also be used to enhance parking assistance features without the need to affix markers in the area of the parking location. Vehicle 50 is provided with at least image capture devices 14, 18, and 22 having FOV's 16, 20, and 24, respectively. As described above, the image capture devices are in communication with a vehicle controller 51 to receive image data. Vehicle 50 is also provided with at least one projection device to cast an external image to areas surrounding the vehicle. At least one of a forward-facing projection device 54 and a rearward-facing projection device 58 emit a predefined image when entering a known parking situation. Front projection fields 56 and rear projection fields 60 are oriented such that when a surfaces of a previously-stored location are within a proximity of the vehicle 50, optical patterns 62 and 64 are within the field of view of the vision system. In one example a vehicle head lamp and/or tail lamp project one or more optical patterns onto a wall surface of a garage.

The vehicle controller 51 may be programmed to execute a self-learning algorithm as discussed above. Similar to previous examples, a driver may park vehicle 50 in an optimum parking location and activate a "parking spot learn" process during which the vehicle 50 calculates its location and orientation, and stores images representing the vicinity of the vehicle. In the example of FIG. 5 through FIG. 7, the stored images include optical patterns 62 and 64 caused by the images emitted from the projection devices 54 and 58, respectively. The vehicle controller may be further programmed to enhance the vehicle location and orientation calculation accuracy based on the position and size of the optical patterns projected within a FOV. In a specific example, the controller generates an estimate of a forward distance 66 to a proximate forward surface and/or a rearward distance 68 to a proximate rear surface based on the size and position of the optical patterns 62 and 64.

Figure 8:
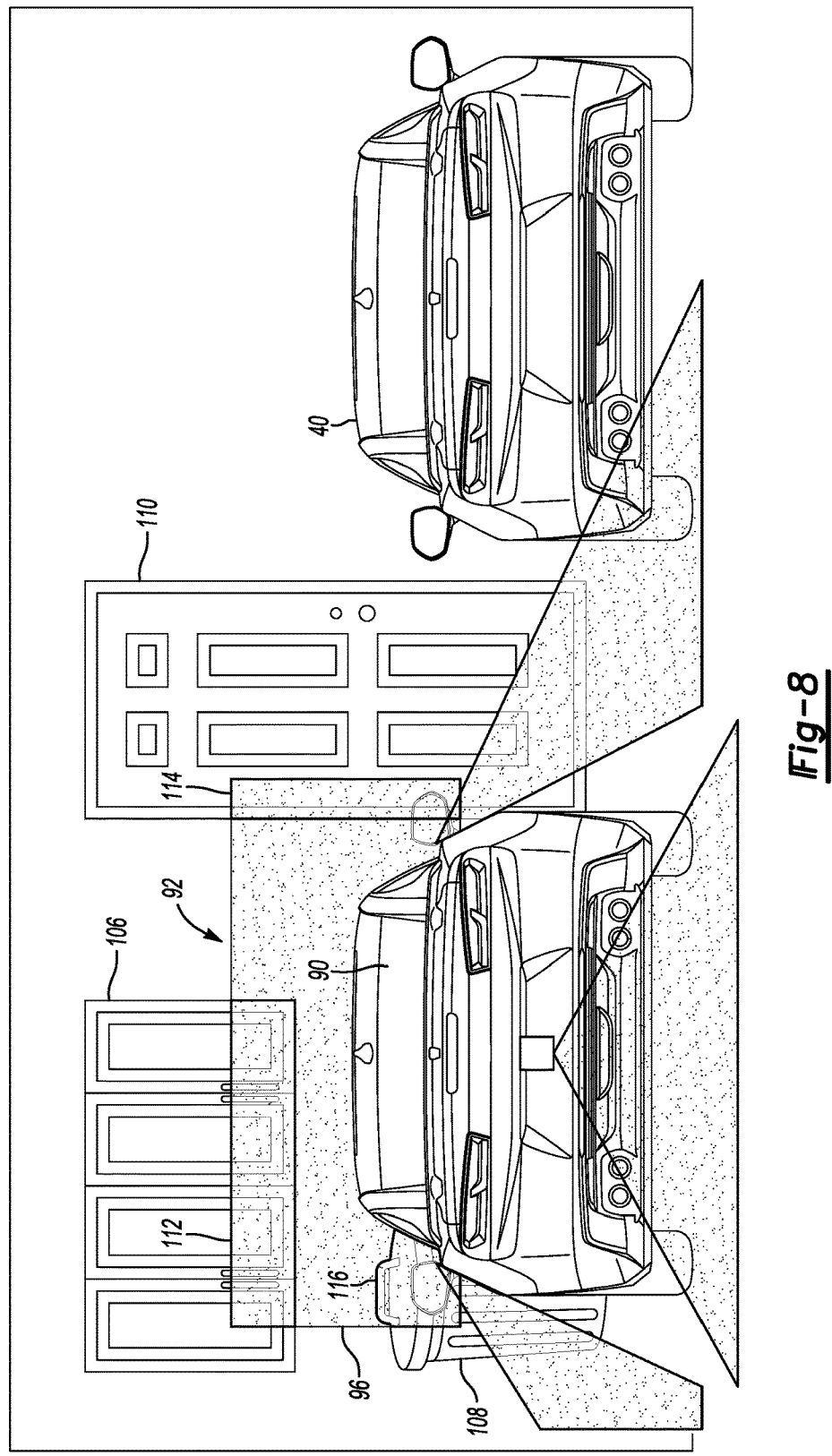
FIG. 8 is a rear view of a vehicle having a vision system according to a third example.
Figure 9:
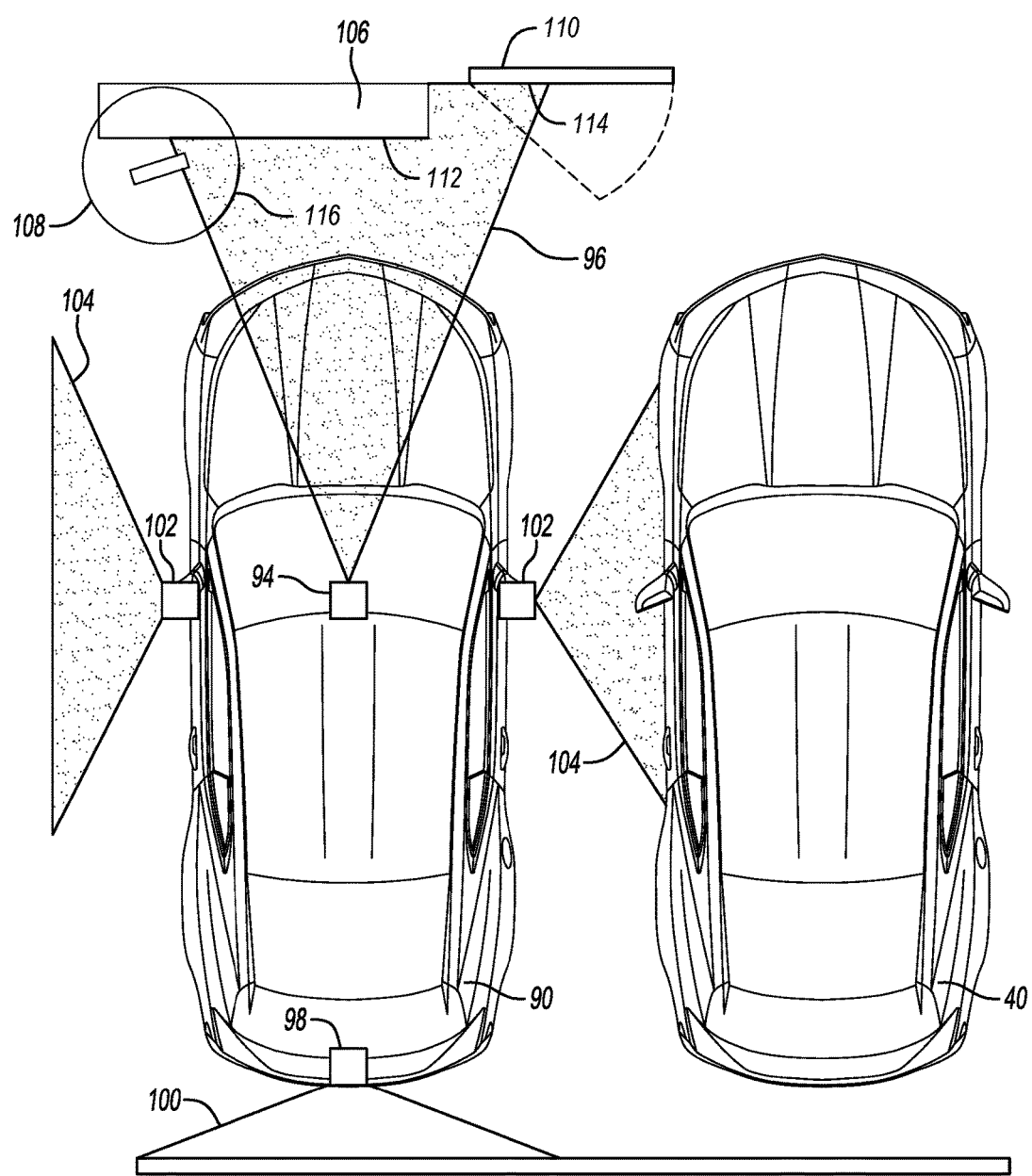
FIG. 9 is a top view of the vehicle of FIG. 8.

Referring to FIG. 8 and FIG. 9, a further example of parking assistance provided by a vision system 92 includes recognition of geometric patterns contained in vicinity images corresponding to the predetermined parking location. Similar to previous examples, a driver may park a vehicle 90 in an optimum parking location and activate a "parking spot learn" process during which the vehicle calculates its location based on location characteristics found within any of a number of FOV's. Fixed native environment objects which are visually detected such as cabinets 106 and door frame 110 for example, may be can be used to assess the accuracy of the position of vehicle 90. In other scenarios such as docking a vehicle at an outdoor parking space, painted ground markers, signs, and parking meters, for example, may all be visually detected as stationary items and similarly used for vehicle positioning. A number of different fixed visual attributes within the vicinity of the vehicle 90 in the parked position may be used to assist parking based on the image patterns collected upon entry of the vehicle into the parking area.

At least part of several non-stationary items, such as trash can 108 and adjacent vehicle 40 may also be captured within one or more FOV's. In the example of FIG. 8, the forward FOV 96 corresponding to the leading end of the vehicle 90 captures both stationary and non-stationary items. While the location of the trash can 108 and/or adjacent vehicle 40 may be relatively consistent, replacement of the non-stationary items may vary between times which each item is brought back to its previous location. Such variation may be perceived by the vision system 92 during subsequent parking maneuvers. The pattern recognition portions of the parking assistance algorithm may include weighting for particular features of a given pattern. More specifically, during each subsequent parking maneuver, items which show no variation in position may be assigned increased confidence regarding their corresponding location. In contrast, items which show variation in position from previous images may be assigned a decreased confidence or be omitted altogether from position calculations. While such non-stationary items may not be relied on for final positioning, these objects are still detected and avoided during vehicle approach and departure. With specific reference to the example of FIG. 8, portion 112 of an image pattern corresponding to cabinets 106 and portion 114 corresponding to door frame 110 may exhibit little or no variation between parking maneuvers. Thus those portion of the image pattern may receive a high weighting in the parking assist algorithm. Comparatively, portion 116 corresponding to trash can 108 may exhibit variation due to different placements of the non-stationary item between parking maneuvers. Thus portion 116 may be afforded little weight in the parking assist algorithm or masked altogether. The algorithm may be configured to continue to self-learn using data acquired during subsequent parking maneuvers and develop increased confidence regarding visual patterns used to guide vehicle positioning.

Figure 10:
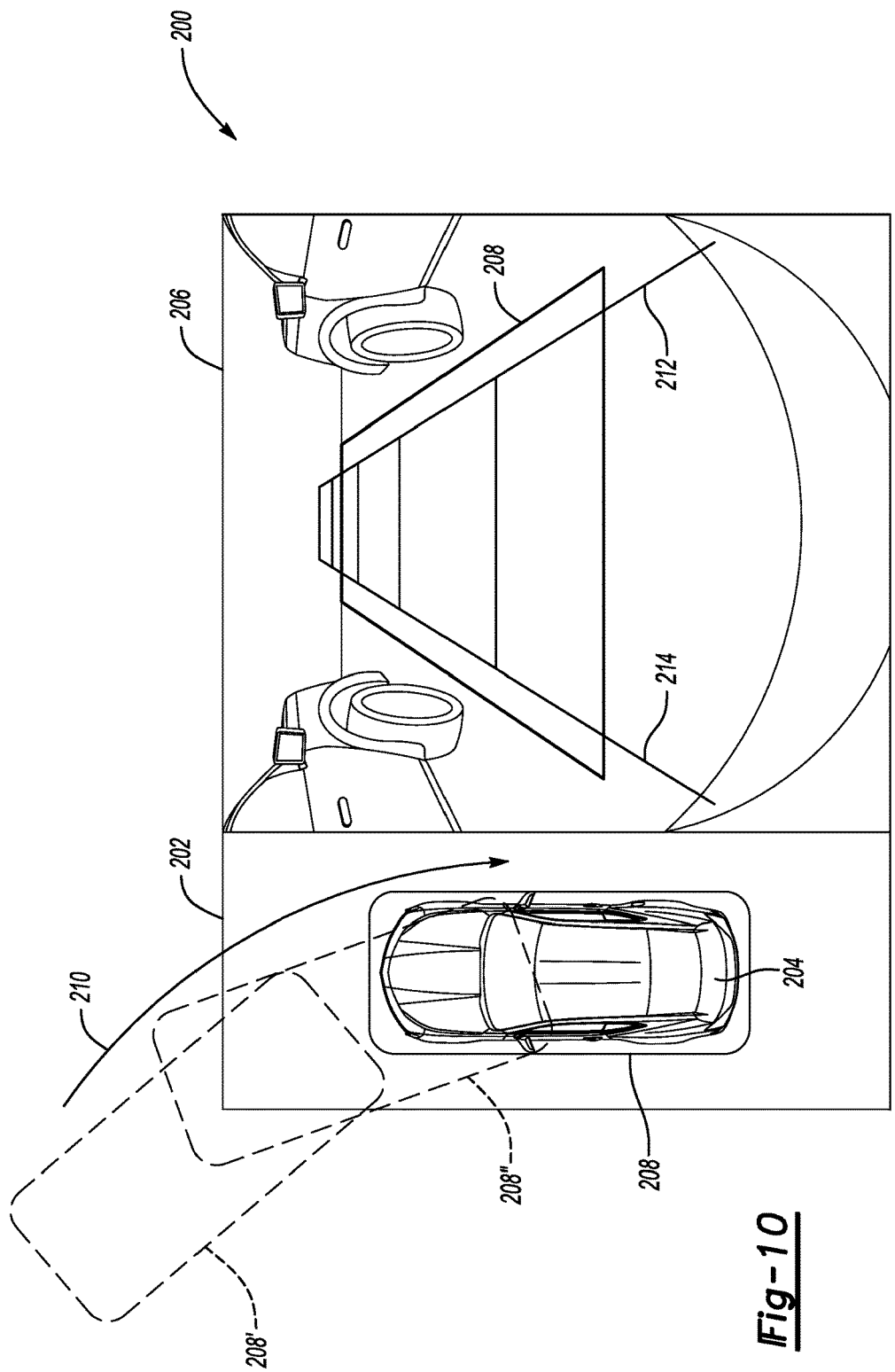
FIG. 10 is a user display interface including parking assistance graphics.

Referring to FIG. 10, parking assist user display 200 is an example aspect of a driver experience when parking. The user display 200 is split into a first display portion 202 depicting a top view 360 degree perimeter of the vehicle 204, and a second display portion 206 showing a live image corresponding to the an image device at the leading end of the vehicle. The user display may be configured to automatically change to a parking assist display when the vehicle approaches a previously-stored parking location. As discussed above, recognition of previously-known parking space may be based on any number of location indicator signals received at a vehicle controller and visual patterns within one or more FOV's of image capture devices. The first display portion 202 of the user display includes a target 208 representing the desired final parking position within the parking area. The position of the target 208 is determined by the techniques discussed above, using both location data and visual patterns acquired during at least one previous self-learning procedure.

In one example, the frame of reference of the 360 degree perimeter view of the first display portion 202 remains fixed and the position of the target 208 moves relative to the vehicle 204 image as the vehicle approaches the final parking position. With continued reference to FIG. 10, the target 208 progresses through position 208" and position 208' along direction 210 as the vehicle approaches the final parking position. Such a progression assists the driver in knowing where to stop their car and whether the vehicle is oriented off-angle relative to the preferred parking spot.

The second display portion 206 includes active guidelines 212 and 214 representing upcoming positions of lateral edges of the vehicle as it approaches the parking space. The guidelines are updated according to the steering angle of the vehicle to depict a corresponding curvature of the path of travel. While such guidelines are generally known in the art, aspects of present disclosure include further modifying the position of the guidelines based on the predetermined location of the preferred final parking position. In some examples, the guidelines are modified to encourage convergence of the vehicle position towards the preferred final parking position. In additional examples, the target 208 is displayed in the second display portion 206 along with the guidelines 212 and 214 in order to provide the driver with an additional real-time assessment of the parking progress.

In additional examples, a vision system similar to those discussed above may be used to prevent or discourage entry of the vehicle into a parking space when doing so may cause vehicle damage. For example, a parking assist algorithm may include executing a confirmation step to ensure that none of the vehicle closure panels are open prior to entry into a known enclosed parking space such as a garage. Particularly in the case of a taller vehicle such as a sport utility vehicle (SUV) having a upward-swinging lift gate closure panel, the algorithm may check to ensure that the lift gate is closed before engaging the parking assist procedure. An open lift gate may make undesired contact with the garage door or other portions of the garage structure above the vehicle. According to one example the algorithm includes monitoring a signal from a closure panel state sensor such as a lift gate ajar switch for an indication that the lift gate is closed prior to entering the garage parking area. According to aspects of the present disclosure, the vehicle controller may be programmed to detect a position of the closure panel based on a signal from a closure panel state sensor, and issue a warning message to deter an approach to the reference vehicle position in response to the closure panel being detected in an open position.

According to another example, the vehicle may rely on one or more stored baseline images captured using a camera mounted on the lift gate to determine the position of the lift gate (i.e., whether open or closed). The baseline images may be captured during the approach toward the desired parking space such that the stored images represent prerequisite conditions needed to engage the parking area. For example the baseline image may include a collection of one or more image patterns including a driveway leading to the parking space. In the case of an open lift gate, the orientation of the lift gate camera would change the FOV of the camera. Therefore the image captured while the lift gate is open would be distinctly different from a baseline image and the algorithm may determine that the lift gate is in an open position. In some examples, a sky image pattern may be previously-stored such the algorithm may detect an open lift gate position having a camera oriented substantially upward towards the sky. As the vehicle approaches the garage location, the algorithm may include calculating a current travel direction, capturing current image patterns using the lift gate camera, then comparing the current image patterns to stored image patterns. In further examples, the algorithm may store a first image pattern associated with the approach of a reverse-driving parking direction, and a second image pattern associated with a forward-driving parking direction. Storing images for both directions would prevent a driver from pulling either forward or in reverse while a closure panel is in an open position. In the case of an autonomous vehicle, the algorithm may further include stopping a parking maneuver in response to detecting an open lift gate.

The open closure panel portions of the parking assistance algorithm may similarly be applied to departure from a parking location. If a closure panel is in an open position when departing from an enclosed parking space, there is risk of contact between the vehicle and the structure of the parking enclosure. The parking assist algorithm may include executing a confirmation step prior to departure from a parking position to ensure all of the closure panels are closed. According to one example, the algorithm includes monitoring a signal from at least one closure panel ajar switch for an indication that the lift gate is closed prior to exiting the garage parking area. Similar to the sky pattern detection and storage discussed above, the algorithm may further include capturing a garage roof image pattern in response to a lift gate being opened when the vehicle is inside the garage. The garage roof image pattern may be compared to a real-time image captured by the lift gate camera to determine if the image corresponds to the garage roof image pattern or a driveway departure path image pattern. If the garage roof image pattern is detected, a warning may be provide to the driver to deter vehicle departure and/or departure of the vehicle may be prevented. According to aspects of the present disclosure, the vehicle controller may be programmed to detect a position of a closure panel based on an image pattern associated with a known closure panel position and issue a command to prevent departure from the reference vehicle position in response to the closure panel being detected in an open position.

In further examples, a vision system similar to those discussed above may be used to prevent or discourage departure of the vehicle from a garage when a garage door is not fully opened or other parking area barrier obstructs the vehicle departure path. The parking assist algorithm may include capturing an image of the departure path when the garage door is fully open. Prior to allowing the driver to initiate vehicle motion for departure, the algorithm may include executing a confirmation step to ensure the garage door is fully open. A current image corresponding to the leading end of the vehicle may be used to determine the state of the garage door prior to vehicle departure. Depending on the parking orientation of the vehicle, the leading end of the vehicle may be either the front end or the rear end. The algorithm may compare the current image to the stored image pattern of the departure path to determine whether the garage door is fully open. If vehicle is moving out of a recognized garage location, start to calculate direction, capture patterns and compared to stored patterns. In further examples, the algorithm may limit the time for which the engine is allowed to run when the garage door is detected to be in the closed state. The algorithm may further include transmitting a warning message to a customer or to authorities for potential exhaust poisoning. In alternated examples, the engine may be prevented from starting when the vision system detects that the vehicle is in a closed space. According to aspects of the present disclosure, the controller may be further programmed to issue a warning message to deter departure from the home vehicle position in response to detection of the parking area barrier obstructing a vehicle departure path.

In additional further examples, a parking assistance algorithm includes conditionally rendering an external view from one or more cameras or other image devices after the vehicle is shifted into "Park." Visible patterns from the images are used to assess the accuracy of the vehicle parked position relative features from the external patterns. If the vehicle is not well positioned, the algorithm includes providing a warning message to the driver regarding suboptimal parking positioning. The warning message may be provided via the user display via text or other graphics and/or via an audible voice warning. In the case of a parking lot having painted markings, the algorithm may recognize such markings as boundaries of a desired parking space, and generate a warning message in response to the vehicle position being off-centered by more than a centering threshold value. Similarly, the algorithm may generate a warning message in response to the vehicle being off-angled by more than an angle alignment threshold. Additionally, the algorithm may generate a warning message in response to the vehicle being positioned further into the desired parking space greater than a depth threshold. In alternate examples, visual features may be generated based on vehicles adjacent to a desired parking space. Similar centering and alignment assessments are developed using the adjacent vehicles. In examples, the camera view is initiated prior to the vehicle being shifted into park.

While the systems and methods discussed above are presented in the context of a passenger motor vehicle, it should be appreciated that the vehicle may be any type of mobile object configured to repeatedly return to known locations. For example an unmanned drone vehicle having a sentinel pattern or other known route may be programmed to return to a home position based on the techniques discussed herein. In such cases a user interface may be remote from the vehicle, and allow a user to prescribe settings and behaviors using data acquired from the vision system.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. a vehicle comprising:
   at least one image capture device;
   a user display configured to display images received from the at least one image capture device; and
   a controller programmed to
      in response to a user prompt to set a home vehicle position, store in a non-transient data memory at least one reference image indicative of a vicinity of the vehicle corresponding to the home vehicle position,
      in response to a subsequent approach toward the vicinity, capture a current image corresponding to a current vehicle position,
      compare the current image to the reference image, and
      generate a graphic at the user display based on the comparison, the graphic depicting the vicinity, the current vehicle position, and the home vehicle position.

2. The vehicle of claim 1 wherein the at least one reference image includes a plurality of markers arranged in a pattern, and the controller is further programmed to generate a deviation value between the home vehicle position and the current vehicle position based on the plurality of markers.

3. The vehicle of claim 2 wherein the plurality of markers include at least one of a two-dimensional bar code, an image projected from the vehicle, stickers, and native vicinity items.

4. The vehicle of claim 1 wherein the controller is further programmed to enter an autonomous vehicle docking sequence when approaching the vicinity to guide the vehicle toward the home vehicle position.

5. The vehicle of claim 1 wherein the at least one image capture device is coupled to a closure panel, and the controller is further programmed to detect a position of the closure panel based on an image pattern associated with a known closure panel position to issue a warning message to deter departure from the home vehicle position in response to the closure panel being detected in an open position.

6. The vehicle of claim 1 wherein the controller is further programmed to, in response to the vehicle entering a parked state following the subsequent approach, generate an assessment message indicative of the current vehicle position in reference to the home vehicle position.

7. The vehicle of claim 1 wherein the controller is further programmed to transmit a signal to operate an infrastructure device based on the vehicle current position.

8. The vehicle of claim 1 wherein the controller is further programmed to capture an image indicative of a position of a closure panel, and prevent departure from the home vehicle position in response to detection of the closure panel in an open position.

9. A method of providing vehicle parking assistance comprising:
   storing a reference vehicle position based on at least one location signal received at a vehicle controller;

capturing at least one reference image indicative of a vicinity of the vehicle while located at the reference vehicle position;

in response to a subsequent approach toward the vicinity, capturing at least one current image indicative of a current vehicle position relative to the reference vehicle position; and generating a display image including a first graphic indicative of the vehicle current position and a second graphic indicative of the reference vehicle position.

10. The method of claim 9 further comprising engaging an autonomous docking procedure to guide the vehicle toward the reference vehicle position such that the first graphic converges with the second graphic.

11. The method of claim 9 further comprising generating at least one docking instruction message to inform a driver how to steer the vehicle towards the reference vehicle position.

12. The method of claim 9 further comprising generating at least one parking assessment message in response to the vehicle being shifted into a parked state following the subsequent approach to the vicinity.

13. The method of claim 12 wherein the parking assessment message is indicative of at least one of a centering assessment, an alignment assessment, and a depth assessment.

14. The method of claim 9 wherein the at least one reference image includes a plurality of markers arranged in a pattern and the vehicle current position is based on an appearance difference between a first pattern in the at least one reference image and a second pattern in the at least one current image.

15. The method of claim 9 wherein the at least one reference image indicates a state of a movable parking area barrier, the method further comprising issuing a command to prevent departure from the reference vehicle position in response to detection of the parking area barrier obstructing a vehicle departure path.

16. A vehicle comprising:
at least one image capturing device;
a user display configured to display images receive from the at least one image capture device; and
a controller programmed to
store in a non-transient data memory a plurality of data sets indicative of a reference vehicle position of the vehicle, the data sets including at least one reference image pattern indicative of a vicinity of the vehicle,
in response to a subsequent approach toward the vicinity, display a target graphic at the user display indicative of the reference vehicle position, and
overlay a current vehicle position graphic with the target graphic to inform a driver of a current vehicle position relative to the reference vehicle position.

17. The vehicle of claim 16 wherein the plurality of data sets further includes at least one of a GPS location signal, a mobile device location, and a Wi-Fi location signal.

18. The vehicle of claim 16 wherein the controller is further programmed to enter an autonomous vehicle docking sequence when approaching the vicinity to guide the vehicle toward the reference vehicle position.

19. The vehicle of claim 16 wherein the current vehicle position graphic is based on at least one current image pattern acquired by the image capturing device during the subsequent approach.

20. The vehicle of claim 16 wherein the controller is further programmed to, in response to the vehicle entering a parked state following the subsequent approach, generate a parking assessment of the current vehicle position relative to the reference vehicle position.

21. The vehicle of claim 16 wherein the at least one image capture device is affixed to a closure panel, and the controller is further programmed to detect a position of the closure panel based on an image pattern associated with a known closure panel position and issue a command to prevent departure from the reference vehicle position in response to the closure panel being detected in an open position.

22. The vehicle of claim 16 wherein the controller is further programmed to detect a position of a closure panel based on a signal from a closure panel state sensor, and issue a command to prevent departure from the reference vehicle position in response to the closure panel being detected in an open position.

23. The vehicle of claim 16 wherein the at least one reference image indicates a state of a movable parking area barrier, and the controller is further programmed to issue a warning message to deter departure from the reference vehicle position in response to detection of the parking area barrier obstructing a vehicle departure path.

24. The vehicle of claim 15 further comprising a projection device arranged to cast an image onto a surface in the vicinity, wherein the reference image includes optical patterns caused by the cast image.

* * * * *